United States Patent [19]

Willer et al.

[11] 4,318,659
[45] Mar. 9, 1982

[54] MANURE SPREADER BOX

[75] Inventors: David A. Willer, Welland; Rory Rae, Wainfleet; Gerardus A. Veldhoven, St. Catharines, all of Canada

[73] Assignee: Deere & Company, Moline, Ill.

[21] Appl. No.: 139,917

[22] Filed: Apr. 14, 1980

[51] Int. Cl.³ .......................... B60P 1/00; B32B 27/06
[52] U.S. Cl. .................................. 414/511; 296/31 P; 428/481
[58] Field of Search ............ 414/511; 296/31 P, 39 R; 217/3 R, 3 CB; 114/69; 105/423; 428/481, 511, 514, 528, 529

[56] References Cited

U.S. PATENT DOCUMENTS

| | | | |
|---|---|---|---|
| 3,413,188 | 11/1968 | Allen | 428/481 X |
| 3,454,417 | 7/1969 | Pascale | 428/481 X |
| 3,887,153 | 6/1975 | O'Reilly et al. | 296/39 R X |
| 3,907,211 | 9/1975 | O'Reilly | 239/676 |
| 4,078,729 | 3/1978 | Foltz | 239/662 |
| 4,082,882 | 4/1978 | Weinstein et al. | 296/31 P X |
| 4,220,280 | 9/1980 | Trott et al. | 239/1 |

FOREIGN PATENT DOCUMENTS

| | | | |
|---|---|---|---|
| 1249368 | 11/1960 | France | 428/481 |
| 1367761 | 9/1974 | United Kingdom | 428/481 |

Primary Examiner—James L. Rowland

[57] ABSTRACT

A material handling implement includes side and wall panels composed of an impact resistant structure having low frictional resistance to the sliding movement of material therefrom. The panels are resistant to the organic acids and salts commonly found in manure and incur minimal moisture buildup on their surfaces. The preferred embodiment of the panel includes a plywood sheet encased within and bonded to fiberglass reinforced polyester sheets.

15 Claims, 6 Drawing Figures

MANURE SPREADER BOX

BACKGROUND OF THE INVENTION

The present invention relates generally to implements for unloading bulk material and more specifically to an implement wherein the side and floor panels are of an improved shock resistant composition having non-stick, low-friction and long-wear characteristics.

Implements for unloading bulk materials, such as manure spreaders, are well known in the art. Conventional manure spreaders include unloading mechanisms having a floor-carried endless chain with transverse slats. The chains and slats are rotated rearwardly to advance the bulk material toward the open end of the implement, whereat a rotating beater reduces the material and throws it from the rear end of the implement. As such implements have increased in size, the chain-type of unloading mechanism has encountered difficulty in moving the volume of material toward the beater mechanism and open end of the spreader. Accordingly, push-off type material discharge mechanisms have been introduced to provide the capability to shift the material and to also improve scraping of the sides of the implement and reduce manual cleaning requirements.

Presently, the sides and floors of such manure spreaders are constructed of steel or wood, both of which present functional and reliability problems. When wood is used for the sides or floors of a manure spreader, as is recommended in U.S. Pat. No. 3,907,211 to O'Reilly, the organic acids and salts present in manure case deterioration. While preservatives are often added to wood to retard such deterioration, it nevertheless occurs with time. Further, the moisture which penetrates wood fibers can increase deterioration. In cold climates where repeated freezing and thawing occurs, the mositure which has penetrated the wood fibers will freeze and then expand. As this moisture, which is generally mixed with solids, freezes and builds up on the walls or floor of the spreader, sliding movement of the bulk material toward the rear of the implement becomes more difficult. On an implement equipped with chains and slats, the slats may jam. If the implement is equipped with a hydraulic ram, it may jam or break if the buildup becomes too great. Occasionally, the shifting mechanism for the ram may be damaged or at least increased downtime will be incurred to break the frozen material from the sides and floor of the implement. Further, wooden sides or walls are less impact resistant after repeated exposures to organic acids or freezing moisture and consequently they often incur damage when frozen manure or other heavy materials are dropped into the implement.

Steel walls and/or floors for manure spreaders better resist impact damages. They nevertheless corrode when exposed to the acids and salts in manure. While copper additives can be added to steel to inhibit rusting, the additional expense merely retards oxidation of the steel. Moisture does adhere to steel and in cold conditions frozen material on the steel walls or floor presents the same problem to movement of a ram or shifting of material toward the back of the box as in a wooden spreader.

One attempt at overcoming the freezing, sticking and deterioration problem is provided in U.S. Pat. No. 4,078,729 Foltz. Foltz has provided an electrically heated floor for his manure spreader to prevent freezing of the liquids during cold weather. Such a solution, however, requires an electrical power source and restricts the usage of the spreader to the locality of that source. Further, the obvious electrical hazard exists.

O'Reilly has provided in U.S. Pat. No. 3,887,153 for a flexible plastic sheet to be mounted on the sides of the implement and arranged to flex during movement of the unloading ram. As the plastic sheet flexes, material frozen to and adhering to it is broken loose. The plastic sheet is less susceptible to corrosion and deterioration than are wood and steel. However, the plastic sheets of O'Reilly are attached to the walls with nails which are subject to corrosion by acids and moisture. Further, the plastic sheets are attached such that moisture can still penetrate between and behind the sheets to permeate the wood. Since O'Reilly has required that the plastic sheet be separated from the wood to assure flexible, moisture and salts can penetrate the wood. Further, O'Reilly has not overcome the problem of assuring a long wear life of the plastic.

In assignee's co-pending application, Ser. No., 966,011, now U.S. Pat. No. 4,220,280, a ram-type manure spreader has been provided with a wooden floor and walls. The wood is covered on opposite sides with plastic. While these side walls and floor surface reduce sticking of the material during sliding movement and unloading of the load, moistures, acids and salts still penetrate the wood between the plastic sheets, requiring that an expensive marine-type grade glue be used between the plies of the plywood to retard and inhibit deterioration of the wall material.

SUMMARY OF THE INVENTION

To overcome these problems, applicants have provided an improved wall and floor structure for a bulk material unloading implement, such as a manure spreader. The wall and floor structures are composed of panels that are comprised of plywood having fiberglass reinforced polyester bonded to the sides and ends of the plywood to totally encase the plywood within the plastic.

To preserve the plywood structure against deterioration and attack by salts or organic acids or moisture, the polyester is bonded to all sides of the plywood to totally encase it.

To provide a flat and rigid surface that can be easily scraped by a hydraulic ram and which inhibits the buildup of frozen or other material, the polyester is bonded to the plywood.

To provide increased impact resistance and wear life, particularly in cold weather environments, plywood is utilized for the panel core and the plywood is then covered with a polyester that is reinforced with glass fibers.

DESCRIPTION OF THE PREFERRED EMBODIMENT

Figure 1:
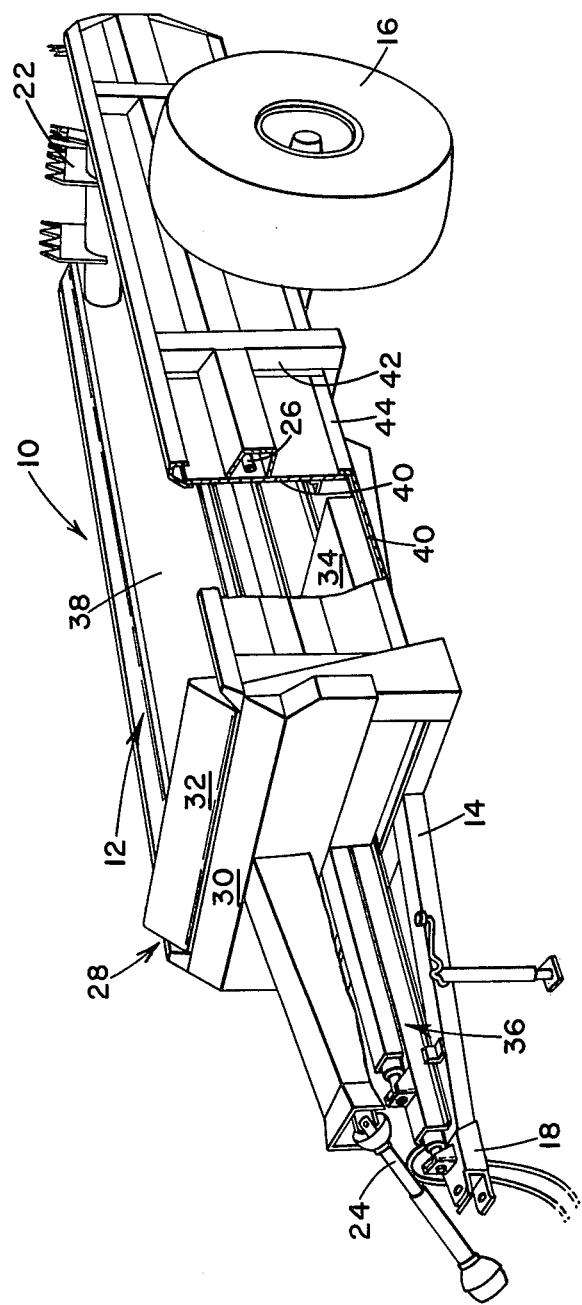
FIG. 1 is a front perspective view of the manure spreader incorporating the improved features of the present invention. A portion of the near side of the wall of the spreader is removed to illustrate the floor and wall panels as assembled into the implement.
Figure 2:
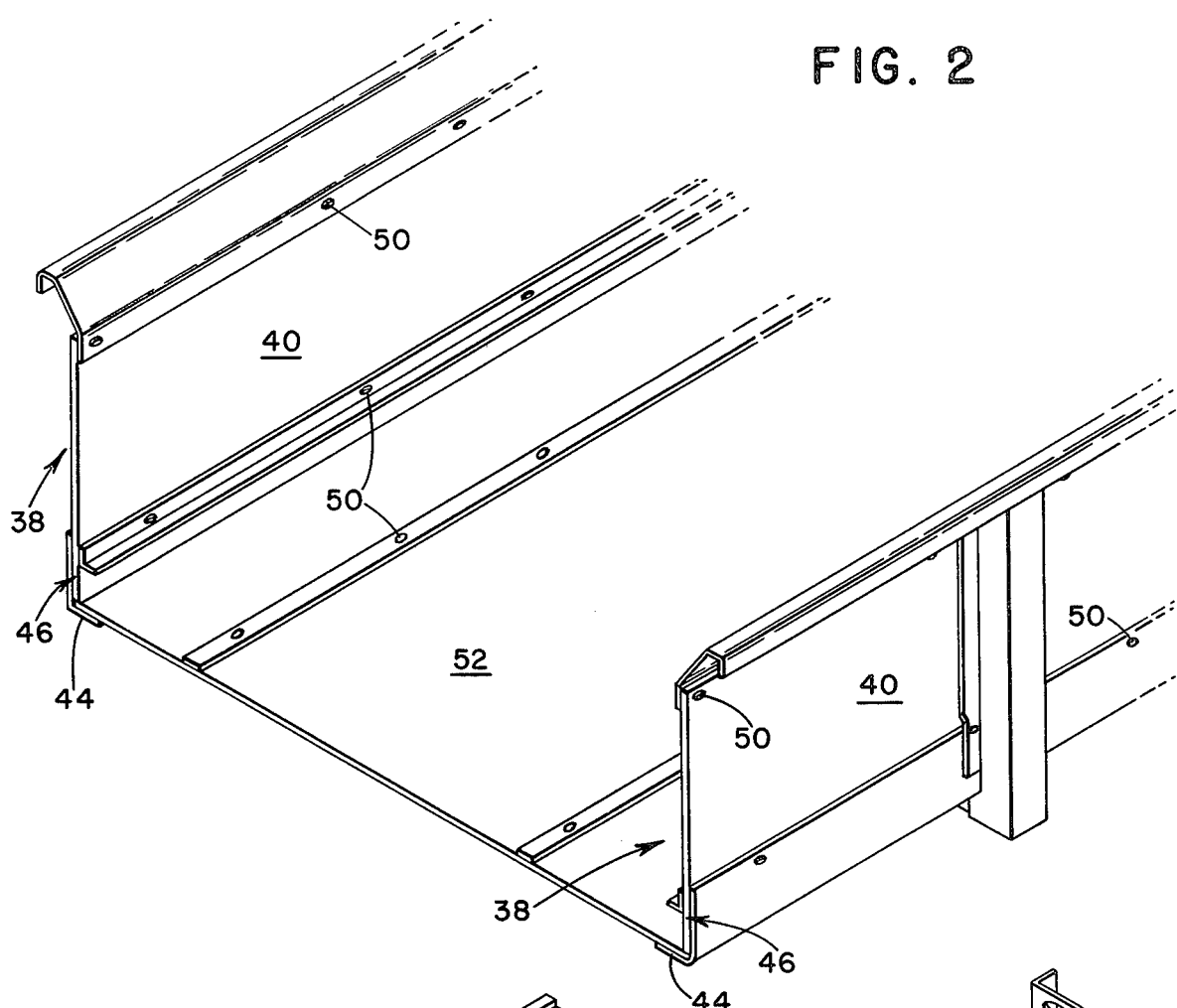
FIG. 2 is a right rear elevated perspective of a portion of the box-like container of the manure spreader with the beater mechanism omitted.
Figure 3:
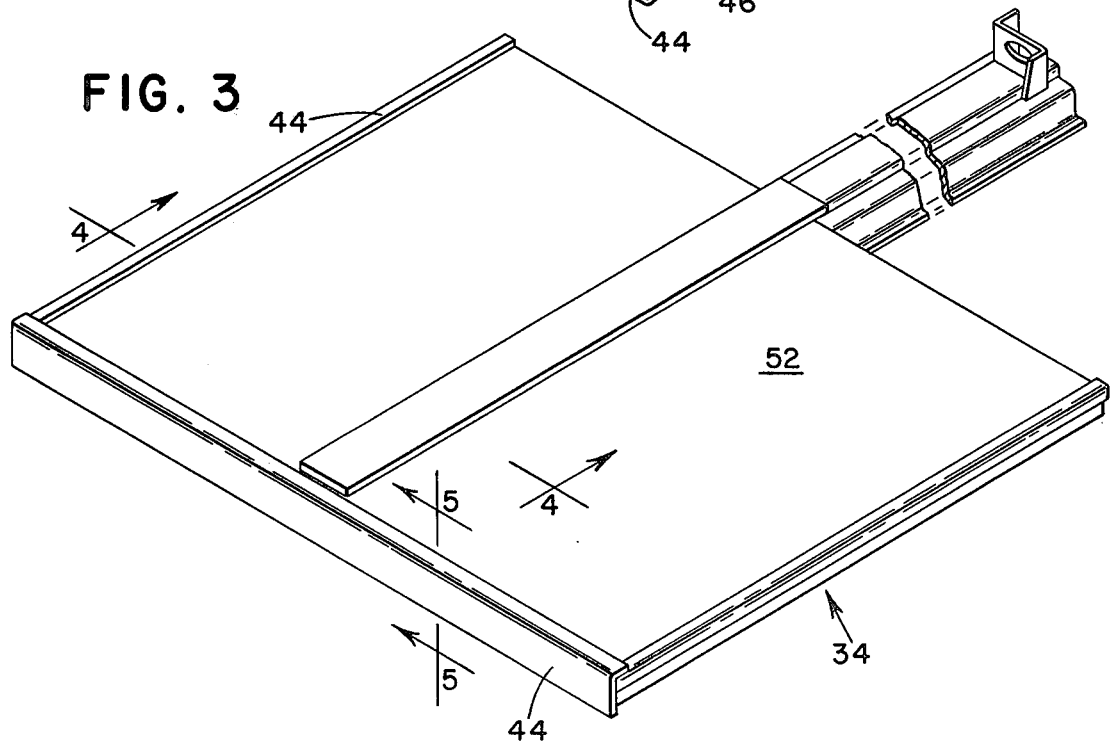
FIG. 3 is a right perspective view of the ram floor of the manure spreader illustrated in FIG. 1.

Referring now to FIGS. 1 and 2, it will be seen that the implement 10 is composed of a material receiving box-like structure 12 open at its rearward end. The box 12 is carried on a frame 14 which in turn is supported on wheels 16. The frame 14 is provided at its forward end with a hitch structure 18 for connection with a tractor or similar traction vehicle. At the rearward end of the box 12 is provided a beater mechanism 22 for reducing and distributing the material behind the implement 10 as it is towed along the field. A PTO shaft 24 is carried at the forward end of the hitch structure 18 for transmitting power in the normal manner from the tractor, and through shafts such as 26 to the beater mechanism 22.

A hydraulic discharge ram 28 is shown in it most forward position adjacent to the front end wall 30 of the box 12. The ram 28 includes the upright wall section 32 and floor section 34, each section 32 and 34 being movable with respect to the other. A staged dual hydraulic cylinder arrangement 36 is carried on and above the frame 14 and extends from the ram 28 under the wall 30 and to the hitch structure 18. The staged dual hydraulic cylinders 36 are provided to sliably shift the upright wall section 32 and floor section 34 fore-and-aft between the walls 38 of the box 12 to move the bulk-like material or manure toward the open end of the spreader 10. As the ram 28 nears the end of the box 12, the wall section 32 is advanced over the floor section 34 to discharge material. A better discussion of this feature is provided in the aforementioned U.S. Pat. No. 4,220,280.

The material containing box 12 is constructed of a skeletal framework or structural support for mounting panels comprised of plywood encased in fiber reinforced polyester. As is best illustrated in FIGS. 1 and 2, the panels 40 are bolted to the supports 42 and 44 of the walls and floor and form the confines of the box 12.

Figure 4:
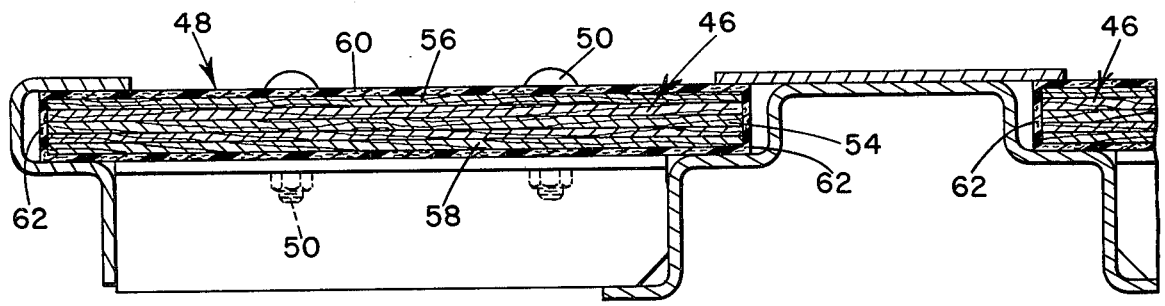
FIG. 4 is an enlarged sectional view taken along line 4—4 of FIG. 3 and illustrating the assembled panels of the ram floor.
Figure 5:
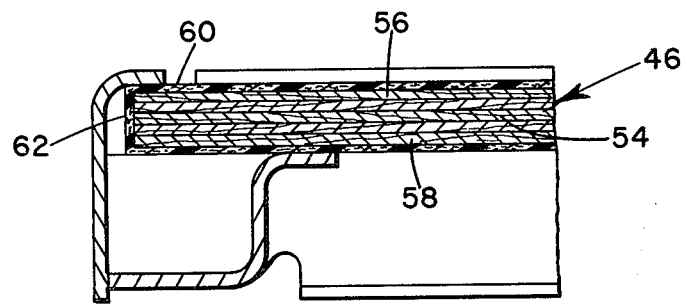
FIG. 5 is an enlarged sectional view of the ram floor taken along line 5—5 of FIG. 3.
Figure 6:
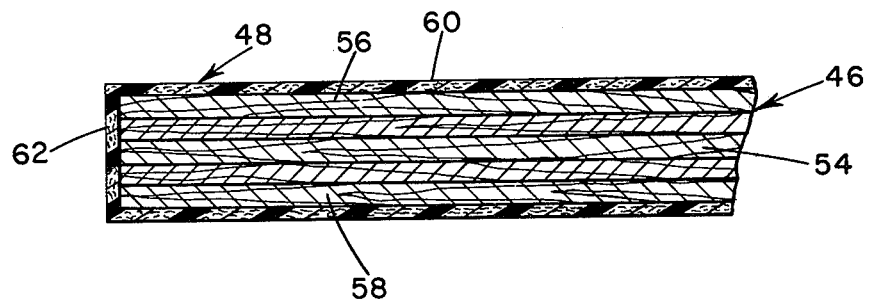
FIG. 6 is an enlarged cross sectional view of the plywood and fiberglass reinforced polyester panel.

FIGS. 4, 5 and 6 better illustrate the specific structure of the panels 40 and metal wall and floor supports 42 and 44. As best seen in FIG. 6, the panels 40 are comprised of plywood 46 encased in polyester 48. Each panel 40 is attached to its respective metal skeletal or support structure 42 or 44 with bolts 50 and each panel 40 comprises the major portion of the wall or floor structure so as to minimize the amount of metal which is subjected to salts, acids and moisture. Additionally, each panel 40 can be reversed since it is covered with polyester or plastic on both sides to extend its usable life.

To provide impact resistance and panel rigidity, it has been determined that a minimum of three laminations of wood are desired in the plywood 46 for the side walls 38 and five laminations are desired for the plywood 46 used for floor panels 52. The preferred inner ply 54 is Grade C or better for both wall and floor panels 38 and 52, while the preferred face 56 and back ply 58 are of Grade B or better. The polyester which is bonded to the sides 60 and edges 62 of the plywood 46 is preferably comprised of 40 to 50 percent polyester resin with up to 24 percent inorganic oxides and silicates and up to 30 percent glass fiber reinforcement. To provide continued flatness and impact resistance, it has been determined that a minimum of 0.7 mm thickness of polyester be provided for each side 60 of the plywood 46 while a minimum polyester thickness of 0.6 mm be provided for each edge and end of the plywood 46. The total thickness of the wall panel 38 is preferred to be approximately ½ inch and approximately ¾ inch for the floor panel 52. To further improve the impact resistance when frozen blocks of material are dropped into the implement 10 and to increase wear life, fiberglass reinforcement is added to the polyester.

The polyester sheet is bonded to the plywood 46 in a steam molding process to assure that the surface of the resultant panel is flat and that the ram and bulk material can easily slide along it with low frictional resistance.

In operation, the hydraulic ram 28 of a loaded manure spreader 10 is activated to shift the load of material rearwardly to the beater mechanism 22 where it can be broken up and propelled outwardly and distributed over the ground. As the sides of the ram upright wall section 32 are shifted within the box 12, the flat and smooth surface of the polyester covered wall panels 38 provide a very low frictional resistance, permitting the use of a much lower capacity hydraulic ram cylinder than has been traditionally possible. Little buildup of moisture or other material occurs on the smooth and flat polyester panel 38 surface and what buildup does occur can easily be sheared off as the upright wall section 32 of the ram 28 moves rearwardly.

Organic acids, salts and/or moisture which are contained in manure cannot penetrate the plywood 46 of the panel since it is encased in the polyester. Neither of these corrosive elements significantly affect the polyester. Accordingly, the life of the panels is significantly greater than the life of a steel or wooden walled or floored spreader.

Should one or more panels be damaged as frozen or other solid materials are loaded into the implement, the farmer can reverse the panel to utilize the other side of the panel and extend the useful life of the implement.

We claim:

1. In a manure spreader comprising a material containing box open at its rearward end for normally containing animal wastes which include organic acids and salts, said box having a fore-and-aft extending and generally horizontal floor, a transversely extending and upright wall at the forward end of the floor, transversely spaced upright wall supports joining the wall and extending rearwardly therefrom, and transverse structure extending between the supports and shiftable rearwardly therebetween to move the wastes toward the open end; and wall panels carried on the wall support, each panel comprising a generally light, impact resistant material subject to deterioration and expansion by the acids and salts and having inwardly and outwardly facing generally flat sides to which is bonded a non-porous, impact resistant structure, the resistant structure bonded to the inwardly facing sides being immediately adjacent and in sliding contact with the transverse structure as it is shited rearwardly, wherein the faces of the respective panels are joined by edges with each edge having a liquid repellant structure bonded thereto, wherein the impact resistant structure and liquid repellant structures form a continuous barrier around the impact resistant material resistant to attack by the organic acids and salts.

2. The invention defined in claim 1 wherein the light material is bonded to and encased within a fiber reinforced polyester resin.

3. The invention defined in claim 2 wherein the floor also includes panels composed of generally light impact resistant material bonded to and encased within a fiber reinforced polyester.

4. The invention defined in claim 2 wherein the material is plywood and the polyester is reinforced with fiberglass fillers so as to provide impact and wear resistance.

5. The invention defined in claim 1 wherein each wall panel is approximately ½ inch thick and the thickness of the impact resistant structure encasing the plywood is at least 0.6 mm.

6. The invention defined in claim 1 wherein the panels are reversibly mounted on said supports.

7. In a manure spreader including a material containing a box open at its rearward end for normally containing liquid animal wastes, said box having fore-and-aft extending and generally horizontal floor supports including opposed inwardly opening track-like members, a transversely extending and upright end wall at the forward end of the floor supports, transversely spaced apart upright sidewall supports adjoining the end wall and extending rearwardly therefrom, an improved floor panel carried by the floor supports and shiftable rearwardly for moving the wastes, said panel comprising a plywood sheet having upper and lower surfaces, laterally opposed edges extending between the surfaces and slidably received between the track-like members, a liquid repellant material bonded to said edges, and non-porous, impact resistant structure bonded to the surfaces and joining the liquid repellant material to encase the plywood sheet and prevent the liquid wastes from penetrating into the plywood sheet via the edges thereof.

8. The invention defined in claim 7 wherein the floor panel is approximately ¾ inch in thickness.

9. In a manure spreader comprising a frame; a frame carried material containing box open at its rearward end for normally containing bulk material including liquid animal wastes, said box having fore-and-aft extending and generally horizontal channel-shaped floor supports, a transversely extending and upright end wall at the forward end of the floor support, and transversely spaced apart upright sidewall supports adjoining the end wall and extending rearwardly therefrom; an upright and transversely extending member supported for fore-and-aft shifting movement between the sidewall supports and above the floor supports; powered means between the frame and sidewall supports for shifting the member; and at least one floor panel reversibly carried by the respective supports, said panel comprising a substantially light laminated sheet with top and bottom surfaces and with edges supported in the channel-shaped supports, and a fiberglass reinforced polyester coating bonded to the sheet at its top and bottom surfaces and edges to encase the sheet and prevent it from being attacked by the liquid, wherein the coated top surface is in sliding contact with the movable member.

10. The invention defined in claim 9 wherein the upright and transversely extending member further includes a generally horizontal member which slidably engages the floor panel during fore-and-aft shifting movement, with both of said members including panels composed of plywood encased within fiberglass reinforced polyester.

11. In a manure spreader having a box for containing animal waste that is open at one end and which has upright sidewalls with horizontal fore-and-aft tracks supported on the internal surfaces thereof, and a floor structure composed of a rear fixed section and a front movable section shiftable fore-and-aft between a front position in which it is a forward extension of the rear section and a rear position in which it overlies the rear section, U-shaped channel structure opening inwardly of and mounted along the edges of the floor sections for carrying the movable floor on the tracks and supporting the fixed floor on the sides and for protecting those edges against scouring and scratching, upon relative movement by the floor section and as the animal waste is shifted on the floor sections, said channels being in non-liquid tight relation with the respective edges so that liquid in the box can reach said edges; and said floor sections being composed of laminated wood cores and external layers of plastic carried on their upper and lower surfaces to their respective edges, said plastic layers being joined at their respective edges by an edge coating of liquid-resistant plastic that prevents the liquid portion of the animal waste from penetrating the core via the edges thereof.

12. The invention as set forth in claim 11 wherein the upright sidewalls comprise a laminated wood core encased in a non-porous, impact resistant structure.

13. In a manure spreader having an animal waste containing box open at one end with a floor section and spaced upright sidewalls between which is supported a movable discharge ram for moving the wastes over the floor section toward the open end, said ram including structure immediately adjacent and slidingly contacting the floor section to prevent wastes from remaining thereon as the ram moves, the floor section comprising: support members connected to the sidewalls, panel structure carried by the support members between the sidewalls and including a laminated wood core and external layers of plastic carried on the upper and lower surfaces of said core, said layers of plastic being joined at their respective edges by an edge coating of liquid-resistant plastic that prevents the liquid portion of the animal waste from penetrating the core via the edges thereof.

14. The invention as set forth in claim 13 wherein the ram includes a movable floor section, and the support members include channel-shaped members slidably receiving the movable floor section for movement relative to the first-mentioned floor section, said movable floor structure comprising a laminated wood core encased in a non-porous, impact resistant structure.

15. The invention as set forth in claim 13 or 14 wherein the ram further includes upright structure immediately adjacent the inner surface of each of the spaced sidewalls, wherein the sidewalls comprise laminated wood cores and external layers of plastic bonded to the opposite surfaces of the cores, said layers of plastic being rigid and flat and joined at their respective edges by a liquid-resistant plastic that prevents the liquid portion of the animal waste from penetrating the cores via the edges thereof, and wherein the opposed inner layers of plastic are uniformly spaced substantially the entire length of the cores and are in sliding contact with the ram upright structure as it moves therebetween to prevent waste build-up on the sidewalls, said liquid-resistant plastic preventing the liquid portion of the animal waste from penetrating the edges of the core and expanding the core to decrease the spacing between the inner layers of plastic.

* * * * *

UNITED STATES PATENT AND TRADEMARK OFFICE
CERTIFICATE OF CORRECTION

PATENT NO. : 4,318,659

DATED : March 9, 1982

INVENTOR(S) : David A. Willer, Rory Rae and Gerardus A. Veldhoven

It is certified that error appears in the above—identified patent and that said Letters Patent is hereby corrected as shown below:

Column 1, line 65, after "4,078,729", insert -- to --.

Column 2, line 15, delete "flexible" and insert -- flexing --.

Column 3, line 21, delete "it" and insert -- its --; line 29, delete "sliably" and insert -- slidably --.

Column 4, line 52, delete "port" and insert -- ports --; line 59, delete "shited" and insert -- shifted --.

Signed and Sealed this

Twenth-eighth Day of September 1982

[SEAL]

Attest:

GERALD J. MOSSINGHOFF

Attesting Officer

Commissioner of Patents and Trademarks